United States Patent
Zhao (10) Patent No.: US 10,802,586 B1
(45) Date of Patent: Oct. 13, 2020

(54) MAGNETIC FINGER TRACKING WITH MULTI-FREQUENCY MODULATION

(71) Applicant: Facebook Technologies, LLC, Menlo Park, CA (US)

(72) Inventor: Yi Zhao, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 177 days.

(21) Appl. No.: 16/174,647

(22) Filed: Oct. 30, 2018

(51) Int. Cl.
*G01D 5/14* (2006.01)
*G06F 3/01* (2006.01)

(52) U.S. Cl.
CPC .............. *G06F 3/014* (2013.01); *G01D 5/14* (2013.01)

(58) Field of Classification Search
CPC .......... G06F 3/014; G01D 5/14; G01D 5/145; G01D 5/2451; G01D 11/30; G01D 5/16; G01R 33/091; G01N 35/026; G01N 35/1016
See application file for complete search history.

(56) References Cited

U.S. PATENT DOCUMENTS

| | | | | |
|---|---|---|---|---|
| 2008/0116888 A1* | 5/2008 | Lee | ........................ | G01C 17/30 324/247 |
| 2009/0045807 A1* | 2/2009 | Nishida | .................. | G01D 5/145 324/207.2 |
| 2012/0223699 A1* | 9/2012 | Holman, Jr. | ........... | G01D 5/145 324/207.2 |
| 2013/0015845 A1* | 1/2013 | Fox | ...................... | G01R 33/091 324/207.21 |
| 2016/0327411 A1* | 11/2016 | Kobayashi | ............... | G01D 5/16 |

* cited by examiner

*Primary Examiner* — Alvaro E Fortich
*Assistant Examiner* — Zannatul Ferdous
(74) *Attorney, Agent, or Firm* — Fenwick & West LLP (57) ABSTRACT

Multiple magnetic field generators have predetermined positions relative to a wearable device, such as a glove, and emit magnetic fields. Additionally, one or more magnetic field sensors are positioned on locations of the wearable device. A magnetic field sensor generates an output signal based on magnetic fields emitted by the magnetic field generator and detected by the magnetic field sensor. From the output signal and the predetermined positions of the magnetic field generators relative to the wearable device, a position and an orientation of the magnetic field sensor in a global coordinate system is determined. In some embodiments, a trained machine learning model is employed in conjunction with trilateration to obtain the position and orientation of the magnetic field sensor from its output signal.

20 Claims, 5 Drawing Sheets

MAGNETIC FINGER TRACKING WITH MULTI-FREQUENCY MODULATION

BACKGROUND

Use of wearable devices as well as virtual reality (VR) or augmented reality (AR) devices has become more commonplace. Conventional wearable, VR, or AR devices commonly receive voice inputs, gestures, inputs from user interaction with one or more of a limited number of buttons or from user interaction with a limited touch area on the wearable, VR, or AR device. However, many of these conventional input mechanisms are inconvenient or awkward for users to operate in various contexts.

When used in conjunction with a head mounted display device, such as those used in VR or AR systems, conventional input mechanisms have additional complications. For example, when interacting with a VR system, users generally expect continuous tracking of gesture input, rather than identification of discrete gestures, to simulate interaction with objects. To provide this continuous tracking, conventional virtual reality systems use computer vision techniques to track movements of a user's body. However, computer vision techniques are limited to identifying gestures within a field of view of an image capture device and are less effective when a portion of a user's body is occluded from the field of view of the image capture device. Some virtual reality systems use inertial measurement units positioned on portions of a user's body to track gestures, but the inertial measurement units suffer from drift error that requires frequent sensor calibration to compensate.

SUMMARY

A wearable device (such as a glove or other control adapted to be worn on a portion of a body) includes a position sensing apparatus that determines spatial positions and orientations of points on the wearable device based on magnetic fields generated by magnetic field generators, which have known positions within (or on) the wearable device, and detected by an array of magnetic field sensors. In some embodiments, the wearable device comprises an array of magnetic field sensors detecting magnetic fields generated by an array of magnetic field generators having known or solvable positions within the wearable device. In one or more embodiments, one or more magnetic field generators (such as permanent magnets or electromagnets) are located at predefined (e.g., known) locations on the wearable device or are located at predefined locations relative to the wearable device.

In one embodiment, the wearable device is a glove having magnetic field sensors positioned at locations along one or more fingers of the glove. The magnetic field sensors detect the magnetic fields at positions corresponding to the locations of the magnetic field sensors, where the magnetic fields are generated by one or more magnetic field generators located at a predefined location on or with respect to the glove. Each magnetic field generator generates a magnetic field that is fixed in relation to the wearable device. For example, the wearable device is a glove and the magnetic field generators are located on a wrist of the glove. Alternatively, the magnetic field generators may be located separately from the wearable device, but in a predetermined or known location and may generate a magnetic field that varies in a predetermined manner in relation to the wearable device. For example, the magnetic generators may be placed on a table top or on a steering wheel of a car, in the case where magnetic field sensors are placed on a wearable glove. In such a case, each finger location being tracked includes a magnetic field sensor and/or a magnetic field sensor that senses field density and/or magnetic field strength and direction of the magnetic field generated by the magnetic field generator. Using the known locations of the one or more magnetic field generators and a trained machine learning model, the spatial position and orientation of each of the tracked locations are determined with respect to a global coordinate system.

DETAILED DESCRIPTION

Overview

A wearable device (such as a glove or other control adapted to be worn on a portion of a body) includes a position sensing apparatus that determines spatial positions and orientations of points on the wearable device based on magnetic fields generated by magnetic field generators and detected by an array of magnetic field sensors. In some embodiments, the wearable device comprises an array of sensors capturing magnetic fields generated by an array of generators having predefined positions relative to the wearable device. As used herein, the term "magnetic field generator" refers to a device that generates one or more magnetic fields. Example magnetic field generators include a magnet, an electromagnet, a permanent magnet, a programmable magnet, and a polymagnet. The term "magnetic field sensor," as used herein, refers to devices that detect one or more magnetic fields and generate output signals based on the detected one or more magnetic fields.

A strength of a magnetic field H, generated by a magnetic field generator (e.g., a magnet) and detected by a magnetic field sensor, at a particular point is proportional to a distance r between the point and the magnetic field generator and to an angle θ between the point and a specific axis of the magnetic field generator. The magnetic field H at the particular point may be decomposed in a Cartesian coordinate system with the magnetic field sensor at the origin and directions $H_x$, and $H_y$, parallel to a horizontal axis and a vertical axis of the magnetic field sensor, respectively. The magnetic field H at the particular point may also be decomposed into a tangential component and a radial component in polar space as two orthogonal vectors: $H_r$ and $H_θ$. These two vectors can be mathematically represented in terms of r and θ by the following pair of equations:

$$H_r = M \cos \theta / 2\pi r^3 \quad (1)$$

$$H_\theta = M \sin \theta / 4\pi r^3 \quad (2)$$

In these equations, M is termed the magnetic moment. When the magnetic field generator is an electromagnet, the value of M is related to the permeability of core material, the current, and the area of the electromagnet. Given a constant alternating current driving the electromagnet, M may be assumed to be a constant.

Figure 1A:
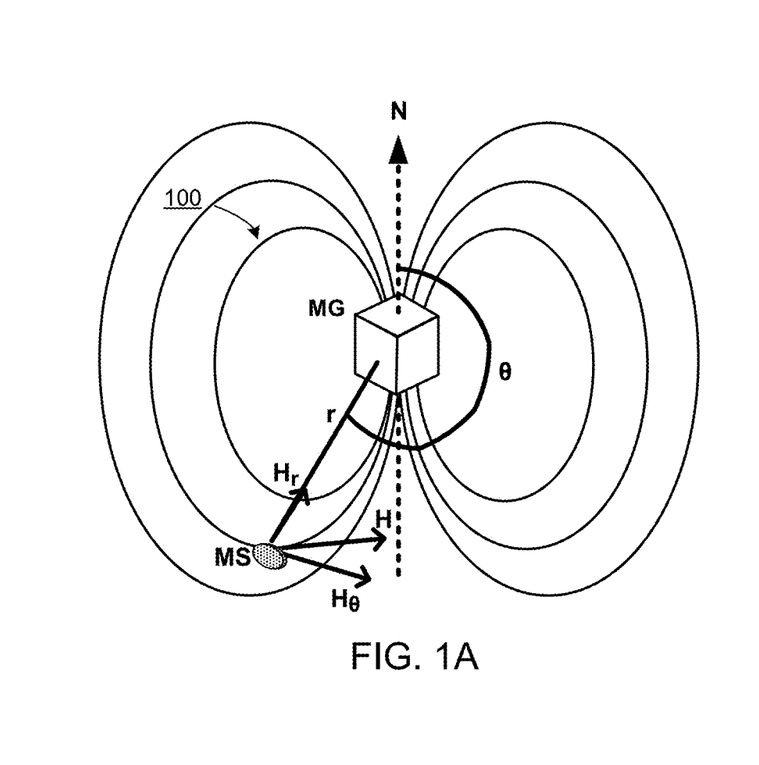
FIGS. 1A-1D illustrate frameworks within which spatial positions between magnetic field sensors and magnetic field generators are determined, in accordance with one or more embodiments.
Figure 1B:
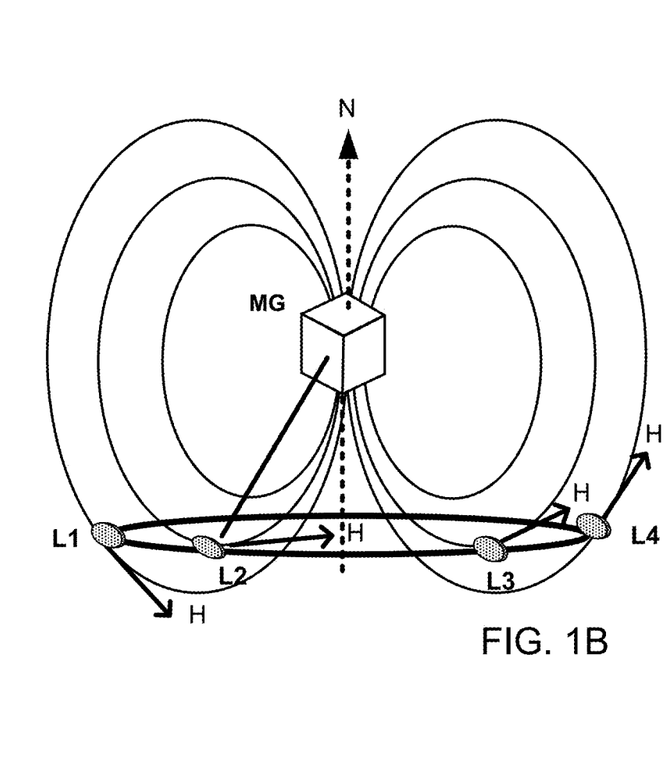

FIGS. 1A-1B illustrate a framework in a magnetic field space for the calculation of spatial relationships between magnetic generators and magnetic field sensors. In FIG. 1A, a magnetic field generator MG generates a magnetic field 100. A magnetic field sensor MS senses the magnetic field generated by the magnetic field generator MG. The sensed magnetic field is depicted by the magnetic field vector H that may be decomposed into orthogonal components in polar space as ($H_r$, $H_\theta$). The magnetic field vector H may also be equivalently decomposed into components in a Cartesian space as (Hx, Hy, Hz). It can be seen from equations (1) and (2) that the magnetic field strength will remain the same for points that are at a common distance r from the magnetic field generator and that make a common angle θ from a specific axis (e.g., an axis along a north pole) of the magnetic field generator MG.

FIG. 1B shows that locations L1, L2, L3, L4 on a circumference of a circle that has a center that is a magnetic axis of the magnetic field generator MG have a common magnetic field strength, since locations L1, L2, L3, L4 each have a common distance from and common angle relative to the magnetic axis of the magnetic field generator MG. In one or more embodiments, a magnetic field generator MG includes one or more magnets; each magnet of a particular magnetic field generator MG may be configured to generate a corresponding magnetic field oriented along a distinct direction from other magnets of the particular magnetic field generator MG.

In some embodiments, a magnetic field generator MG comprises one or more programmable magnets (e.g., a polymagnet) that provide programmable, controllable, or reconfigurable magnetic field properties. Programmable magnets enable control over characteristics of the programmable magnets, such as a number of magnetic poles, a density of magnetic poles (number and distribution of magnetic poles over a given surface area), a spatial orientation/configuration/layout of magnetic poles, magnetic field strength, a variation of magnetic field strength as a function of spatial coordinates (e.g., distance from the programmable magnet), focal points of the magnetic field, mechanical forces (e.g., attraction, repulsion, holding, alignment forces) between poles of the same polymagnet or between polymagnets, etc. For example, a spatial field density or a field orientation mapping may be configured for a programmable magnet to uniquely or distinctly encode position and/or orientation of different magnets of the programmable magnet or different magnetic field sensors MS. In some embodiments, programmable magnets (e.g., polymagnets), as well as programmable magnetic sensors MS may be programmed to provide stronger magnetic fields or magnetic fields concentrated within shorter ranges to improve resolution and accuracy of determination of magnetic sensor MS positions within shorter ranges of the magnetic field generators.

Location Tracking

In one or more embodiments, given known, or predefined, locations of a plurality of magnetic field generators MG, equations (1) and (2) above may be solved to obtain a distance (r) and an orientation (θ) of a magnetic field sensor MS relative to one or more of the magnetic field generators MG based on the magnetic field ($H_r$ and $H_\theta$) detected at the magnetic field sensor MS. However, as illustrated in FIG. 1B, because points located on a circle concentric with a magnetic axis of the magnetic field generator MG are located at a common distance and orientation (i.e., angle) from the magnetic field generator MG, there is spatial ambiguity in three dimensions when determining the distance and orientation of a magnetic field sensor MS relative to a magnetic field generator MG. Similarly, given known, or predefined, locations of a magnetic field sensor MS relative to a magnetic field generator MG, equations (1) and (2) above may be solved to obtain a distance (r) and an orientation (θ) of the magnetic field sensor MS relative to one or more of the magnetic field generators MG based on the magnetic field ($H_r$ and $H_\theta$) detected at the magnetic field sensor MS.

One approach to resolve the above-identified spatial ambiguity uses an analytical model described below in equation (3) to characterize a total magnetic field strength as follows:

$$\|H\| = (H_r)^2 + (H_\theta)^2 = K^* r^{-6} (3 \cos^2 \theta + 1) \quad (3)$$

where ‖H‖ is the norm-2 of the vector identifying distance and orientation of a magnetic field sensor MS, r is the distance between the magnetic field sensor MS and the magnetic field generator MG, θ is an orientation of the magnetic field sensor MS relative to the magnetic field generator MS (as further described above in conjunction with Equations 1 and 2), and K is a constant that is a factor of constant M (e.g., $K = M^2 / 16\pi^2$). The constant K can be leveraged to redesign magnetic field generators MG. Hence, equation (3) includes the variables—distance r between the magnetic field sensor MS and the magnetic field generator MG and orientation θ of the magnetic field sensor MS relative to the magnetic field generator. However, an assumption that the coefficient K in equation (3) is a constant is not entirely accurate, because this assumption ignores variations in the value of the magnetic moment M based on environmental and material properties. Thus, results obtained using the analytical model described in equation (3) may exhibit variable and limited accuracy at different locations relative to the magnetic field generator.

Accordingly, various embodiments described herein comprise a system including magnetic field generators MG and magnetic field sensors MS configured to address the inaccuracies described above, to resolve the spatial ambiguities in determining the locations of points of magnetic fields detected from a magnetic field generator MG, and to generate a constrained or over-constrained system to solve for six degrees of freedom describing the position change and angular orientation change of a point where magnetic fields from the magnetic field generator MG is being tracked over time. In some embodiments, the system achieves this based on sensor readings at a magnetic field sensor MS that is located at the point and that is detecting magnetic fields generated by at least three magnetic field generators MG located at known positions in a global coordinate space.

Figure 1C:
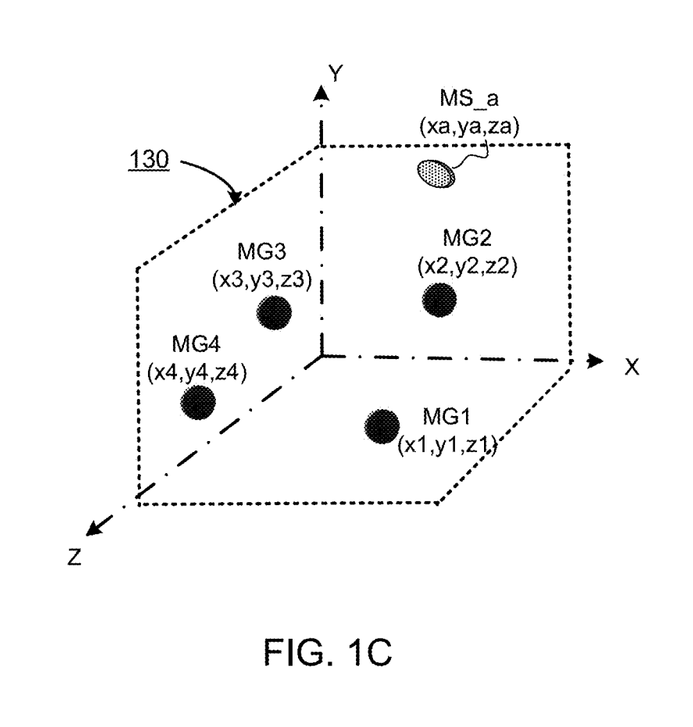

In some embodiments, the system uses a fixed (e.g., known or predetermined) layout of one or more magnetic field generators MG within a global coordinate system. FIG. 1C illustrates an example of a Cartesian coordinate system 130 system in which each of multiple magnetic field generators MG1, MG2, MG3, and MG4 have known locations with respect to the depicted coordinate system. For instance, in the illustration of FIG. 1C, MG1 has a known location, (x1, y1, z1), MG2 has a known location (x2, y2, z2), MG3 has a known location (x3, y3, z3), and MG4 has known location (x4, y4, z4) with respect to the depicted global Cartesian coordinate system. Furthermore, a magnetic field sensor, MS_a is at an unknown location (xa, ya, za) and is configured to generate a signal responsive to a detected magnetic field that is oriented along a distinct direction. The signal generated by MS_a is based on the magnetic fields that are generated by each of the multiple magnetic field generators MG1, MG2, MG3, and MG4 and detected by MS_a.

Figure 1D:
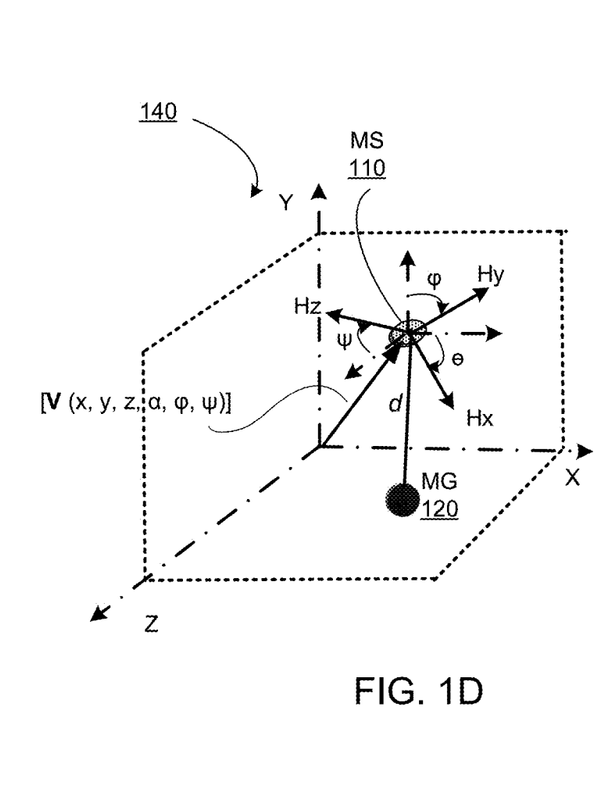

FIG. 1D illustrates the 3-dimensional framework 140 for determining the spatial position and orientation in 3D Cartesian space for a configuration with a single magnetic field sensor (MS) 110 that is located at a tracked point (xa, ya, za) and a single magnetic generator (MG) 120 having a predetermined or known location. In the example of FIG. 1D, a spatial position is expressed as a vector V that has multiple components representing spatial coordinates (positions or orientations) in a multi-dimensional space. For example, in a three dimensional (3D) coordinate system, as the tracked point (xa, ya, za) moves, a vector V (x, y, z, α, φ, ψ) is used to represent the six degrees of freedom of movement of the tracked point, with components (x, y, z) representing position change along three orthogonal Cartesian coordinate axes (X, Y, Z), and components (α, φ, ψ) representing angular orientation change defined with respect to three mutually perpendicular Cartesian axes (X, Y, Z) or with respect to mutually perpendicular Cartesian planes (YZ, XZ, and XY). The components of the spatial vector V(x, y, z, α, φ, ψ) represent six degrees of freedom describing the complete location of the tracked point in space. Embodiments described herein are directed to tracking points that move over time in space by using magnetic field sensors 110 located at the tracked points, and establishing spatial vectors, as described above, for each of the tracked points using known positions of one or more magnetic field generators 120, as well as a trained machine learning model. In some embodiments, a spatial vector (e.g., vector V, as illustrated in FIG. 1D) is defined for each magnetic field sensor 110 to represent Cartesian distances along three orthogonal Cartesian coordinate axes (X, Y, Z). The spatial vector may also include angular orientations represented as angles (α, φ, ψ) made by the sensing axes of a magnetic field sensor 110 (e.g., X, Y, and Z) with the Cartesian coordinate axes.

In some embodiments, each magnetic field sensor 110 includes one or more constituent sensing elements (e.g., one or more magnetometers), where each sensing element (magnetometer) is configured to generate a signal responsive to a detected magnetic field that is oriented along a distinct direction (e.g., a distinct coordinate axis). For example, a magnetic field sensor 110 includes three sensing elements configured to generate corresponding signals that are directly related to magnetic fields along the three different orthogonal axes (X, Y, and Z) of a three dimensional spatial coordinate system. In an embodiment, a magnetic field sensor 110 includes three Hall-effect sensors that are configured to generate current outputs that are proportional to magnetic fields detected along three different orthogonal axes of a three-dimensional spatial coordinate system.

As illustrated in FIG. 1D, the spatial vector V including the Cartesian distances (x, y, z) and angular orientations (α, φ, ψ) of a point where a magnetic field sensor 110 is located may be computed based on the signals detected by the magnetic field sensor 110 responsive to the magnetic fields (Hx, Hy, Hz) generated by a magnetic field generator 120. In some embodiments, the spatial vector V of a tracked magnetic field sensor 110 is determined by generating a constrained or over-constrained system using multiple magnetic field generators 120, as shown in in FIG. 1C. In one embodiment, at least three magnetic field generators 120 are located at predetermined positions within a global coordinate system. Each magnetic field generator 120 is transmitting at one or more known frequencies. Magnetic field sensors 110 are located at each point that is being tracked by the system, and each magnetic field sensor 110 independently detects magnetic fields and generates output signals from the detected magnetic fields.

To determine a position and an orientation of a magnetic field sensor 110 in a global coordinate system in which one or more magnetic field generator 120 have known positions, a relative distance between the magnetic field sensor 110 and each magnetic field generator 120 emitting a magnetic field using multiple frequencies is determined. Referring to FIG. 1D, the distance 'd' between magnetic field generator 120 and magnetic field sensor 110 is determined, where, if magnetic field sensor 110 is located at (unknown) position $(x_a, y_a, z_a)$:

$$d^2 = (x_a^2 + y_a^2 + z_a^2) \quad (4)$$

When determining the distance d between the magnetic field sensor 110 and the magnetic field generator 120, an output signal from the magnetic field sensor 110 is obtained and decomposed into a set of directional component frequencies. In various embodiments, decomposition of the output signal into the set of directional component frequencies is performed by applying a Fourier transform (FFT) convolution filter to the output signal. The set of directional frequency components obtained from application of the FFT convolution filter corresponds to frequencies transmitted from each of at least three magnetic field generators 120 having known positions and each using multiple frequencies to emit one or more magnetic fields. Thus, application of the FFT convolution filter effectively decomposes the output signal (Hx, Hy, Hz) from the magnetic field sensor 110 from a set of directional values $(Hx_j, Hy_j, Hz_j)$ that correspond to the output signal from the magnetic field sensor 110 corresponding to the magnetic fields generated by each of a plurality of magnetic field generators 120, j, (e.g., at least three magnetic field generators 120). Thus, the magnitude of the magnetic field generated, by each of the at least three magnetic field generators 120 at the location of the sensor may be obtained using the following equation:

$$\|H_j\|^2 = Hx_j^2 + Hy_j^2 + Hz_j^2, j=1, \ldots, k, k>=3 \quad (5)$$

In some embodiments, each magnetic field generator 120, j, transmits multiple known frequencies. In this case, the corresponding component signals obtained from application of the FFT convolutional filter to the output signal of the magnetic field sensor 120 for magnetic fields detected from each of the magnetic field generators 120 may be averaged to obtain a single magnetic field strength value $\|H\|_j$ for each magnetic field generator 120.

Subsequently, the distance d, between the magnetic field sensor 110 and each of the magnetic field generators 120 is determined. The relationship between the distance, $d_j$, between the magnetic field sensor 110 and each magnetic field generator 120 is modeled using a trained machine learning regression model that characterizes the output signal strength from the magnetic field sensor 110 for a magnetic field generator 120 as a polynomial of the form:

$$\|H_j\| = C_4 * d_j^4 + C_3 * d_j^3 + C_2 * d_j^2 + C_1 * d_j + C_0, \ j=1, \ldots, k, \ k >= 3 \quad (6)$$

In equation (6), j identifies a magnetic field generator 120 and the coefficients ($C_4$, $C_3$, $C_2$, $C_1$, $C_0$) are determined during a training phase of the machine learning regression model. Using a trained machine learning regression model instead of the analytical model based on equation (3), these embodiments avoid the inaccuracies further described above in conjunction with the description of equation (3). From equation (5), the known magnetic field strength $\|H_j\|$ at a magnetic field sensor 110 corresponding to a magnetic field emitted from a magnetic field generator 120, j, is determined and used in the trained machine learning regression model described in equation (6) to solve for the relative distance, $d_j$ to obtain the relative distance from the magnetic field sensor 110 to each of the j magnetic field generators 120.

From the determined relative distance, $d_j$, between the magnetic field sensor 110 and each of the magnetic field generators 120, as well as the predefined location of each of the magnetic field generators 120 in the global coordinate system, trilateration is employed to compute the location of the magnetic field sensor 110 in the global coordinate system. Thus, if the unknown position of the magnetic field sensor 100 is represented in the global coordinate system as ($X_s$, $Y_s$, $Z_s$), and the known positions of the magnetic field generators 120 are represented as ($X_{gj}$, $Y_{gj}$, $Z_{gj}$), for each of k magnetic field generators 120, the following trilateration equation holds true:

$$(X_s - X_{gj})^2 + (Y_s - Y_{gj})^2 + (Z_s - Z_{gj})^2 = d_j, \ j=1, \ldots, k, \ k >= 3 \quad (7)$$

In equation (7), the unknown quantities are ($X_s$, $Y_s$, $Z_s$) for the magnetic field sensor 110. With k equations corresponding to the k magnetic field generators 120, the system is solvable. As shown by the trilateration equation (7), at least three magnetic field generators 120 each emitting magnetic fields via a single frequency allow resolution of the position of the magnetic field sensor 110 in the global coordinate system. However, other embodiments may use different numbers of magnetic field generators 120 emitting magnetic fields at different frequencies. For example, four field generators 120 that each emit magnetic fields at a plurality of frequencies (e.g., a frequency and an additional frequency that is higher than the frequency) allow more accurate resolution of the position of the magnetic field sensor 110 in the global coordinate system. Additionally, the preceding example allows the position of the magnetic field sensor 110 in the global coordinate system to be determined over a larger area and allows changes in position of the magnetic field sensor 110 to be more quickly identified.

After determining the position of the magnetic field sensor 110 in the global coordinate system, as described above, an orientation of the magnetic field in the global coordinate system is determined. The relationship between the magnetic field strength detected by the magnetic field sensor 110 and the orientation of the magnetic field sensor 110 is represented as $$T_{R,P,Y} H = T_{R,P,Y} \begin{pmatrix} H_x \\ H_y \\ H_z \end{pmatrix} = \begin{pmatrix} H_r \\ H_\theta \\ 0 \end{pmatrix} = \begin{pmatrix} M\cos\theta/2\pi r^3 \\ M\sin\theta/4\pi r^3 \\ 0 \end{pmatrix} \quad (8)$$

where H is the magnetic field vector detected by the magnetic field sensor 110 and $T_{R,P,Y}$ is a rotation matrix with three unknown variables—roll, R, pitch, P, and yaw Y, which correspond to angular orientations ($\alpha$, $\varphi$, $\psi$), respectively, shown in FIG. 1D. Given the output signal values $H_j$ from the magnetic field sensor 110 for each magnetic field generator 120, j, and the determined relative distances between the magnetic field sensor 110 and a magnetic field generator 120, $d_j$, (i.e., in equation (8), $r_j^3 = d_j^3$), there are at least three equations (one for each of at least three magnetic field generators 120) and three unknown quantities—roll, R, pitch, P, and yaw, Y. Hence, with three or more magnetic field generators 120, equation 8 represents a constrained or over-constrained system capable of being solved for roll, R, pitch, P, and yaw, Y.

In further embodiments, a tracking system performing the steps described herein tracks spatial positions of one or more magnetic field sensors 110 over time. This allows the tracking system to determine changes to the spatial position of a magnetic field sensor 110 over time. For example, a wearable glove includes magnetic field sensors 110 located along one or more fingers of the glove, and a tracking system having known positions of three or more magnetic field generators 120 performs the steps described herein to dynamically track locations of the magnetic field sensors 110 located along the one or more fingers of the glove over time.

In some embodiments, the complete spatial position (i.e., the spatial vector V(x, y, z, $\alpha$, $\varphi$, $\psi$) representing six degrees of freedom describing the complete location) of the magnetic field sensor 110 is determined by employing a Kalman filter to mitigate statistical noise and other inaccuracies in output signals from the magnetic field sensor 110. A Kalman filter employs a noise model along with one or more prior estimates of positions and orientations of the magnetic field sensor 110 in the global coordinate system to filter a current output signal of the magnetic field sensor 110. In some embodiments, the noise model may describe the noise as a function of the distance from the magnetic field generators. The filtered output signal of the magnetic field sensor 110 is subsequently used to determine the position and orientation of the magnetic field sensor 110 in the global coordinate system as further described above, at a current time.

Thus, the described steps allow a tracking system to track positions of magnetic field sensors 110 in space by establishing spatial vectors, $V_i$, for each of the tracked points, $P_i$ including a magnetic field sensor 110 using magnetic field generators 120 at predefined positions that emit magnetic fields using multiple frequencies. For purposes of illustration, the preceding steps were described with respect to a single magnetic field sensor 110; however, the preceding steps may be performed for multiple magnetic field sensors 110, with positions and orientations of different magnetic field sensors 110 in the global coordinate system determined in parallel, as determination of a position and an orientation of a magnetic field sensor 110 in the global coordinate system is independent of output signals from other magnetic field sensors 110.

Figure 2A:
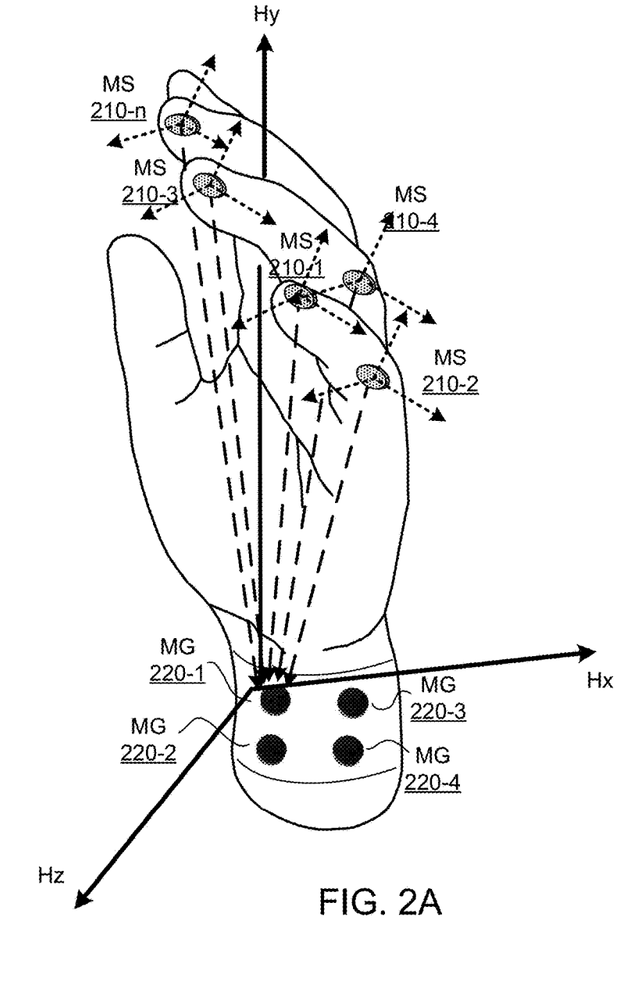
FIG. 2A-2B illustrate positions of magnetic sensors and magnetic field generators in relation to a wearable device on a hand, where a plurality of magnetic sensors positioned at different fingers coupled to a plurality of displayed magnetic field generators, in accordance with one or more embodiments.
Figure 2B:
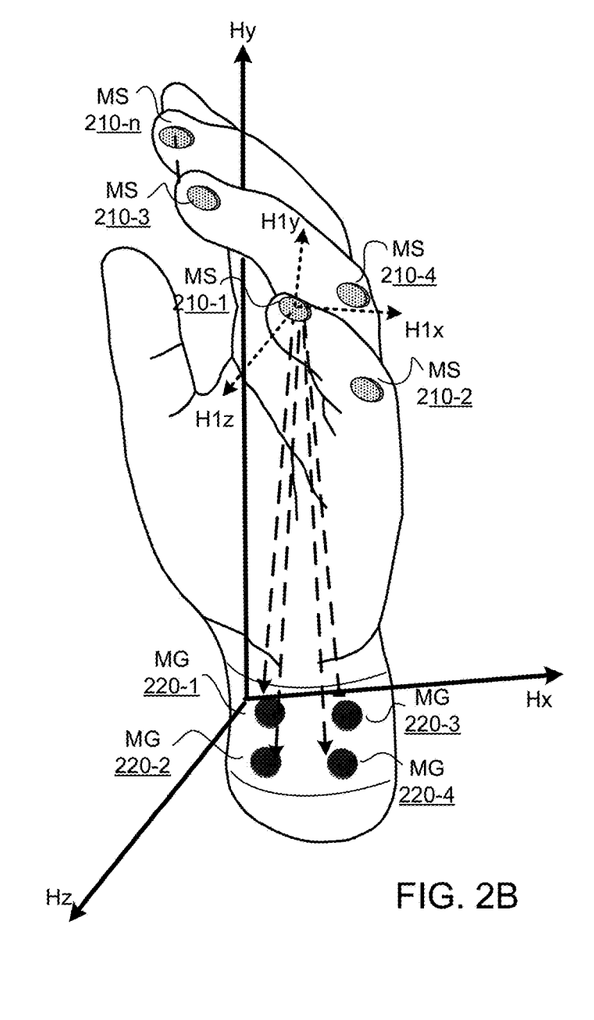

Tracking Multiple Magnetic Field Sensors at Different Locations Using Magnetic Field Generators at Predefined Locations FIG. 2A and FIG. 2B together illustrate an embodiment comprising multiple magnetic field generators and multiple magnetic field sensors. In the example shown by FIGS. 2A and 2B, multiple magnetic field sensors (MS) 210-1, 210-2, ..., 210-n, are shown in relation to a hand, with the magnetic field sensors 210-1, 210-2, ..., 210-n located at different finger positions of the hand to act as proxies for particular finger locations. Also in the example shown by FIGS. 2A and 2B, multiple magnetic field generators (MG) 220-1, 220-2, 220-3, and 220-4 are shown located at or near the wrist of the hand; however, in other embodiments the magnetic field generators 220-1, 220-2, 220-3, and 220-4 may have any location. For example, the magnetic field sensors (MS) 210-1, 210-2, . . . , 210-n and the magnetic field generators (MG) 220-1, 220-2, 220-3, and 220-4 may be coupled to or included within a wearable glove configured to be worn around the hand.

In some embodiments, each of the magnetic field sensors 210-1, 210-2, . . . , 210-n include one or more sensing elements. For example, each magnetic field sensor 210-1, 210-2, . . . , 210-n includes a plurality of sensing elements having predefined, known, or solvable positions relative to each other. Each magnetic field sensor 210-1, 210-2, . . . , 210-n outputs a signal (or combination of signals) responsive to the magnetic fields (Hx, Hy, Hz; or $H_r$ and $H_\theta$) generated by MG 220-1, 220-2, 220-3, and 220-4 and detected at the respective magnetic field sensor MS 210-1, 210-2, . . . , 210-n.

The magnetic field generators (MG) 220-1, 220-2, 220-3, and 220-4 may include a single permanent magnet or an electromagnet. In alternative embodiments, the magnetic field generators (MG) 220-1, 220-2, 220-3, and 220-4 include a plurality of permanent magnets having distinct (e.g., and known or solvable) spatial positions relative to each other, as well as having different (e.g., and known or solvable) orientations relative to each other. In alternative embodiments, the magnetic field generators (MG) 220-1, 220-2, 220-3, and 220-4 include one or more programmable magnets (e.g., polymagnets) having configurable or modifiable magnetic properties.

For ease of illustrations, FIGS. 2A and 2B illustrate two aspects of an embodiment. FIG. 2A depicts that the magnetic field generated by a magnetic field generator 220-1 is detected or sensed by each of the multiple magnetic field sensors MS 210-1, 210-2, . . . , 210-n. FIG. 2B depicts that an output signal generated by a magnetic field sensor 210-1 is based on the magnetic fields generated by each of the multiple magnetic field generators 220-1, 220-2, 220-3, and 220-4 and detected by the magnetic field sensor 210-1. Thus, combining the depictions in FIGS. 2A and 2B, an output signal generated by each magnetic field sensors 210-1, 210-2, . . . , 210-n is based on magnetic fields generated by multiple magnetic field generators MG 220-1, 220-2, 220-3, and 220-4 and detected by a magnetic field sensor 210-1, 210-2, . . . , 210-n.

As further described above, a spatial vector described in a global coordinate system (e.g., a Cartesian space), such as depicted in FIG. 1D, is computed for each magnetic field sensor using the known locations of each magnetic field generator 220-1, 220-2, 220-3, and 220-4 and known frequencies with which each magnetic field generator 220-1, 220-2, 220-3, and 220-4 emit magnetic fields. Thus, with respect to FIGS. 2A and 2B, given magnetic field sensors MS(i), i=1 . . . n, and magnetic field generators MG(j), j=1 . . . 4, a spatial position vector V (i) is computed for a magnetic field sensor MS(i). Each spatial position vector V(i) includes Cartesian distances along three orthogonal Cartesian coordinate axes (X, Y, Z) and an angular orientation (angles α, φ, ψ).

With respect to FIGS. 2A and 2B, computation of the spatial position vector for sensor 210-1 is described below. The positions of each of the field generators 220-1, 220-2, 220-3, and 220-4 are known, and frequencies at which each magnetic field generator 220-1, 220-2, 220-3, and 220-4 emit magnetic fields are also known.

To determine the spatial position vector V(i) for the magnetic field sensor 210-1, an output signal H(i) is obtained from the magnetic field sensor 210-1. The output signal of the magnetic field sensor 210-1 is based on strengths of magnetic fields generated by multiple magnetic field generators 220-1, 220-2, 220-3, and 220-4 and detected by the magnetic field sensor 210-1. A Fourier transformation (FFT) convolution filter operation applied to the output signal H(i) decomposes the output signal H(i) from the magnetic field sensor 210-1 into a set of directional frequency components $H_h(i)(Hx_j, Hy_j, Hz_j)$, with j=1 . . . 4, which corresponds to the magnetic fields generated by each of the magnetic field generators 220-1, 220-2, 220-3, and 220-4 and detected at a location of the magnetic field sensor 210-1.

For each magnetic field generator 220-1, 220-2, 220-3, and 220-4, the decomposed set of directional frequency components $H_j(i)$(Hxi, Hyi, Hzi) for magnetic fields detected by the magnetic field sensor 210-1 from each of the magnetic field generators 220-1, 220-2, 220-3, 220-4 is used to determine a signal strength $\|H_j(i)\|$ of a magnetic field detected by the magnetic field sensor 210-1 from each individual magnetic field generator 220-1, 220-2, 220-3, 220-4. Thus, in the example depicted in FIGS. 2A-2B, with four magnetic field generators 220-1, 220-2, 220-3, and 220-4, four directional vectors are computed by a magnetic field sensor 220-1. Hence, for magnetic field sensor 220-1, the output signal from magnetic field sensor 220-1 is decomposed into four sets of directional components, with each set of directional components corresponding to a magnetic field detected from a particular magnetic field generator 220-1, 220-2, 220-3, and 220-4. For example, decomposing the output signal from magnetic sensor 210-1 results in a set of directional components: $H_1(1)$(Hx1,Hy1,Hz1) for a magnetic field generated by magnetic field generator 220-1 and detected by magnetic field sensor 210-1, $H_2(1)$(Hx2,Hy2, Hz2) for a magnetic field generated by magnetic field generator 220-2 and detected by magnetic field sensor 210-1, $H_3(1)$(Hx3,Hy3,Hz3) for a magnetic field generated by magnetic field generator 220-3 and detected by magnetic field sensor 210-1, and $H_4(1)$(Hx4,Hy4,Hz4) for a magnetic field generated by magnetic field generator 220-4 and detected by magnetic field sensor 210-1. Given that a magnetic field emitted by a single magnetic field generator 220-1, 220-2, 220-3, and 220-4 and detected by the magnetic field sensor 210-1 satisfies equation (5), further described above, the magnetic field strengths detected by magnetic field sensor 210-1 for magnetic fields emitted by each individual magnetic field generator 220-1, 220-2, 220-3, and 220-4 are, respectively, obtained as:

$$\|H_1(1)\|^2 = Hx1^2 + Hy1^2 + Hz1^2, \text{ for magnetic field generator 220-1} \quad (9)$$

$$\|H_2(1)\|^2 = Hx2^2 + Hy2^2 + Hz2^2, \text{ for magnetic field generator 220-2} \quad (10)$$

$$\|H_3(1)\|^2 = Hx3^2 + Hy2^2 + Hz3^2, \text{ for magnetic field generator 220-3} \quad (11)$$

$$\|H_4(1)\|^2 = Hx4^2 + Hy2^2 + Hz4^2, \text{ for magnetic field generator 220-4} \quad (12)$$

For each of the magnetic field sensors 210-1, 210-2, . . . , 210-n, a relative distance, d, between a magnetic field sensor 210-1, 210-2, . . . , 210-n and each of the magnetic field generators 220-1, 220-2, 220-3, 220-4 is computed based on the output signal strengths obtained from equations (9)-(12). In various embodiments, the relative distances between a magnetic field sensor 210-1 and each magnetic field generator 220-1, 220-2, 220-3, and 220-4 are determined using a trained machine learning regression model that characterizes the signal strength $\|H\|$ of a magnetic field from each magnetic field generator 220-1, 220-2, 220-3, and 220-4 detected by the magnetic field sensor 210-1 as polynomial of the form described in equation (6) to solve for the individual distances between magnetic field sensor 210-1 and each of the magnetic field generators 220-1, 220-2, 220-3, and 220-4.

From the determined relative distances between the magnetic field sensor 210-1 and each magnetic field generator 220-1, 220-2, 220-3, and 220-4, and the known positions of each magnetic field generator 220-1, 220-2, 220-3, and 220-4, trilateration may be performed using equation (7), further described above, to generate an over-constrained system that is solved for a spatial position of the magnetic field sensor 210-1 in the global coordinate system, such as a global Cartesian space. Positions of the other magnetic field sensors 210-2, . . . 210-$n$ in the global coordinate system may be similarly computed.

Using the relative distances between the magnetic field sensor 210-1 and each of the magnetic field generators 220-1, 220-2, 220-3, and 220-4 and the determined output signal strengths from magnetic fields detected by the magnetic field sensor 210-1 from each of the magnetic field generators 220-1, 220-2, 220-3, and 220-4, equation (8) above is used to obtain equations for the four magnetic field generators 220-1, 220-3, 220-3, and 220-4 and for roll, pitch, and yaw of the magnetic field sensor 210-1 in the global coordinate system. Thus, for the example system including four magnetic field generators 220-1, 220-2, 220-3, 220-4, equation (8) represents an over-constrained system that is solvable for the roll, pitch, and yaw of the magnetic field sensor 210-1 in the global coordinate system, thereby providing the angular orientation of the magnetic field sensor 210-1 in the global coordinate system. Angular orientations of the other magnetic field sensors 210-2, . . . 210-$n$ may be similarly computed.

In a configuration with at least three magnetic field generators 220-1, 220-2, 220-3, and 220-4, the above-described computations the spatial position and the angular orientation of each of the magnetic field sensors 210-1, 210-2, . . . 210-$n$ in the global coordinate system may be performed in parallel, as determination of a spatial position and an angular orientation of a magnetic field sensor 210-1, 210-2, . . . 210-$n$ is independent of other magnetic field sensors 210-1, 210-2, . . . 210-$n$.

In alternative embodiments, the magnetic field generators 220-1, 220-2, 220-3, 220-4 are located at different finger positions of the hand to act as proxies for particular finger locations, while a magnetic field sensor 210-1 is placed at a predefined location, such as a wrist of the user. However, in using magnetic field generators 220-1, 220-2, 220-3, 220-4 to track locations, the magnetic field generators 220-1, 220-2, 220-3, 220-4 have relatively large physical sizes, and reduction of their physical size limits an area in which the positions and orientations of the magnetic field generators 220-1, 220-2, 220-3, 220-4 may be determined in a global coordinate system. Additionally, this configuration with magnetic field generators 220-1, 220-2, 220-3, 220-4 in tracked locations results in a system that can be solved for spatial position and one orientation parameter in the global coordinate space, while positioning magnetic field sensors 210-1, . . . 210-$n$ at different finger positions of the hand and magnetic field generators 220-1, 220-2, 220-3, and 220-4 at predefined locations allows spatial position and three orientation parameters of the magnetic field sensors 210-1, . . . 210-$n$ to be determined.

System Architecture

Figure 3:
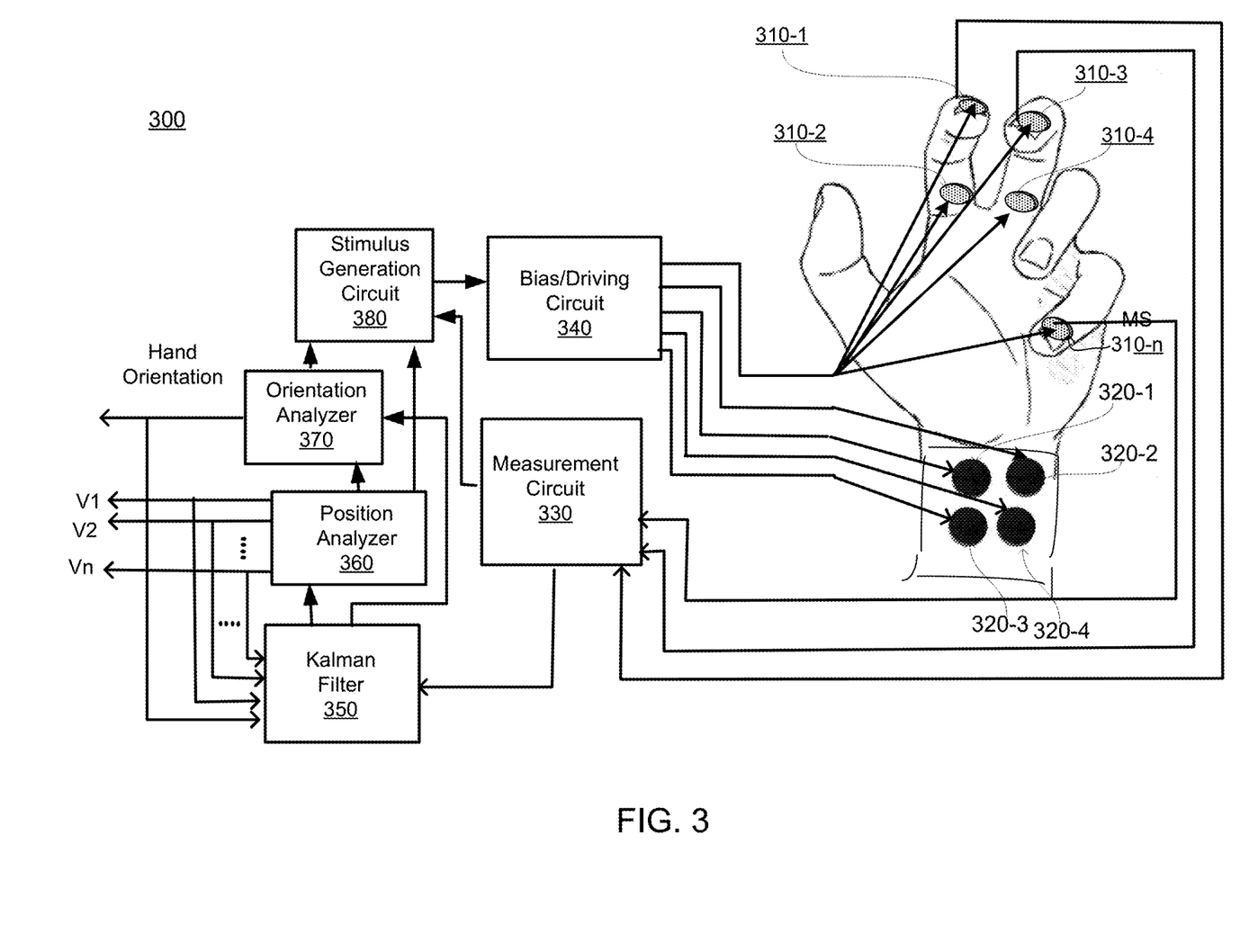
FIG. 3 illustrates a system for tracking the position and orientation over time of magnetic field sensors on a wearable device, in accordance with one or more embodiments.

FIG. 3 illustrates one embodiment of a system 300 for determining position and orientation of magnetic field sensors 310-1, 310-2, 310-3, 310-4 relative to magnetic field generators 320-1, 320-2, 320-3, and 320-4. In various embodiments, the system 300 may include different or additional components than those described in conjunction with FIG. 3. Additionally, functionality provided by different components described below in conjunction with FIG. 3 may be differently allocated among various components of the system 300 in some embodiments.

In the example shown in FIG. 3, the system 300 includes four magnetic field sensors 310-1, 310-2, 310-3, 310-4; however, in other embodiments, the system architecture may include any number of magnetic field sensors. Additionally, the system architecture 300 includes multiple magnetic field generators 320-1, 320-2, 320-3, and 320-4, as further described above in conjunction with FIGS. 2A and 2B. In various embodiments, the system 300 may include additional sensors (not shown) such as inertial sensors such as accelerometers and gyroscopes. The system 300 also includes a bias/driving circuit 340 for providing bias signals (such as power and other operating signals) and driving signals (such as stimulating/driving currents and voltages) to the magnetic field sensors 310-1, 310-2, 310-3, 310-4 and to the magnetic field generators 320-1, 320-2, 320-3, and 320-4. The driving signals provided to each magnetic field generator 320-1, 320-2, 320-3, and 320-4 may be disambiguated from the corresponding driving signals provided to other magnetic field generators 320-1, 320-2, 320-3, and 320-4 based on attributes such as frequency, timing, modulation codes, modulation patterns, and so on. A measurement circuit 330 included in the system 300 is coupled to the magnetic field sensors 310-1, 310-2, 310-3, and 310-4 and obtains output signals from the magnetic field sensors 310-1, 310-2, 310-3, and 310-4. In embodiments, the measurement circuit 330 processes the output signals from various magnetic field sensors magnetic field sensors 310-1, 310-2, 310-3, and 310-4. For example, the measurement circuit 330 filters, amplifies, or performs any other suitable operations to on the output signals from the magnetic field sensors 310-1, 310-2, 310-3, 310-4.

The magnetic field sensors 310-1, 310-2, 310-3, 310-4 may each include a sensing element that is resonant to certain frequencies and may be tuned to respond to those frequencies, allowing the magnetic field sensors 310-1, 310-2, 310-3, 310-4 to detect magnetic fields generated by different magnetic field generators 320-1, 320-2, 320-3, and 320-4 that use different frequencies to generate magnetic fields. In other embodiments, the magnetic field sensors 310-1, 310-2, 310-3, 310-4 may not have a sensing element tuned to particular frequencies at which different magnetic field generators 320-1, 320-2, 320-3, and 320-4 are generating magnetic fields. In these embodiments, the measurement circuit 330 includes a fast Fourier transformation (FFT) convolution filter that decomposes a single composite signal output by a magnetic field sensor 310-1, 310-2, 310-2, 310-3 into a set of directional frequency components corresponding to frequencies at which different individual magnetic field generators 320-1, 320-2, 320-3, and 320-4 generate magnetic fields.

In some embodiments, the system 300 dynamically tracks positions of the magnetic field sensors 310-1, 310-2, 310-3, 310-4 over time; in the example of FIG. 3, this allows the system 300 to dynamically track positions of portions of a user's fingers on which the magnetic field sensors 310-1, 310-2, 310-3, 310-4 are positioned. In such dynamic tracking embodiments, output signals from magnetic field sensors 310-1, 310-3, 310-3, 310-4 at different times may be noisy or incomplete. Accordingly, the system 300 includes a Kalman filter 350 that predicts or estimates positions and orientations of various magnetic field sensors 310-1, 310-2, 310-3, 310-4 from a series of incomplete or noisy output signals from the magnetic field sensors 310-1, 310-2, 310-3, 310-4 over time. The Kalman filter 350 employs a noise model along with prior estimates of tracked positions and orientations of magnetic field sensors 310-1, 310-2, 310-3, 310-4 to filter output signals from the measurement circuit 330 obtained at a current time. In some embodiments, the noise model employed by the Kalman Filter 350 may describe the noise as a function of the distance from the magnetic field generators. The filtered output signals are transmitted from the Kalman filter 350 to a position analyzer 360 and an orientation analyzer 370 that, respectively obtain the tracked positions and orientations of one or more magnetic field sensors 310-1, 310-2, 310-3, 310-4 at the current time from the filtered output signals. In embodiments where the system 300 includes additional sensors (not shown) such as inertial sensors, such as accelerometers and gyroscopes, data from the additional sensors may be incorporated into the Kalman filter and used to predict positions and orientations of various magnetic field sensors 310-1, 310-2, 310-3, 310-4 over time.

The position analyzer 360 receives filtered signals from the Kalman filter 350 and computes spatial positions of each magnetic field sensor 310-1, 310-2, 310-3, 310-4 in the global coordinate system. As further described above in conjunction with FIGS. 1A-2B, the position analyzer 360 determines a spatial position of a particular magnetic field sensor 310-1, 310-2, 310-3, 310-4 by initially computing a strength of a magnetic field of a particular magnetic field generator 320-1, 320-2, 320-3, 320-4 at detected at the particular magnetic field sensor 310-1, 310-2, 310-3, 310-4 using the filtered set of directional frequency components received from the Kalman filter 350. The relative distance d between each pair of a particular magnetic field sensor 310-1, 310-2, 310-3, 310-4 and a particular magnetic field generator 320-1, 320-2, 320-3, 320-4 is then obtained by using the computed strength of the magnetic field emitted by the particular magnetic field generator 320-1, 320-2, 320-3, 320-4 and detected by the particular magnetic field sensor 310-1, 310-2, 310-3, 310-4 using a trained machine learning regression model. The machine learning regression model represents the field strength of the magnetic field generated by the particular magnetic field generator 320-1, 320-2, 320-3, 320-4 and detected by the particular magnetic field sensor 310-1, 310-2, 310-3, 310-4 at a given time as a polynomial function of the relative distance d between a pair of a particular magnetic field sensor 310-1, 310-2, 310-3, 310-4 and a particular magnetic field generator 320-1, 320-2, 320-3, 320-4. Additionally, the spatial position computation performed by the position analyzer 360 performs a trilateration operation, further described above in conjunction with FIGS. 1A-2B, using known locations in a global coordinate system of each of the magnetic field generators 320-1, 320-2, 320-3, and 320-4, and the relative distance computed between each pair of a particular magnetic field sensor 310-1, 310-2, 310-3, 310-4 and a particular magnetic field generator 320-1, 320-2, 320-3, 320-4 to obtain spatial positions of each magnetic field sensor 310-1, 310-2, 310-3, 310-4 in the global coordinate system.

The position analyzer 360 transmits the relative distances computed between each pair of a particular magnetic field sensor 310-1, 310-2, 310-3, 310-4 and a particular magnetic field generator 320-1, 320-2, 320-3, 320-4 to the orientation analyzer 370. Additionally, the orientation analyzer 370 receives a set of directional frequency components from the Kalman Filter 350. The orientation analyzer uses equation (9), further described above, to compute a rotation matrix with three unknown variables representing roll, pitch, and yaw that correspond to angular orientations ($\alpha$, $\varphi$, $\psi$), based on the known locations of the magnetic field generators 320-1, 320-2, 320-3, 320-4 in the global coordinate system, the relative distance d between each pair of a particular magnetic field sensor 310-1, 310-2, 310-3, 310-4 and a particular magnetic field generator 320-1, 320-2, 320-3, 320-4 from the position analyzer 360, as well as directional frequency components of the magnetic field strength sensed at the sensor. Together, the position analyzer 360 and the orientation analyzer 370 compute the spatial position vector V(i) which includes Cartesian distances along three orthogonal Cartesian coordinate axes (X, Y, Z) and an angular orientation (angles $\alpha$, $\varphi$, $\psi$) with respect to the global coordinate system for each of the different magnetic field sensors 310-1, 310-2, 310-3, 310-4 at different times.

In one or more embodiments, the system 300 also includes a stimulus generation circuit 380 configured to generate signals that modify biasing and driving properties of the magnetic field sensors 310-1, 310-2, 310-3, 310-4 or the one or more magnetic field generators 320-1, 320-2, 320-3, 320-4 based on output signals obtained from the one or more magnetic field sensors 310-1, 310-2, 310-3, 310-4. The stimulus generation circuit 380 may receive signals from one or more of: the position analyzer 360, the orientation analyzer 370 and the measurement circuit 330, and modify one or more properties of one or more of the magnetic field generators 320-1, 320-2, 320-3, and 320-4 based on the received signals.

The spatial positions and orientations of the magnetic field sensors 310-1, 310-2, 310-3, 310-4 determined from the position analyzer 360 and the orientation analyzer, respectively, may be combined to determine locations of portions of a user's hand (or other portions of the user's body) on which the magnetic field sensors 310-1, 310-2, 310-3, 310-4 are positioned. In some embodiments, the spatial location of a portion of the user's hand (e.g., a fingertip) corresponds to coordinates in a three dimensional (3D) space given a fixed reference system such as a geo-positioning system defined relative to the Earth (e.g., in terms of longitude and latitude).

Figure 4:
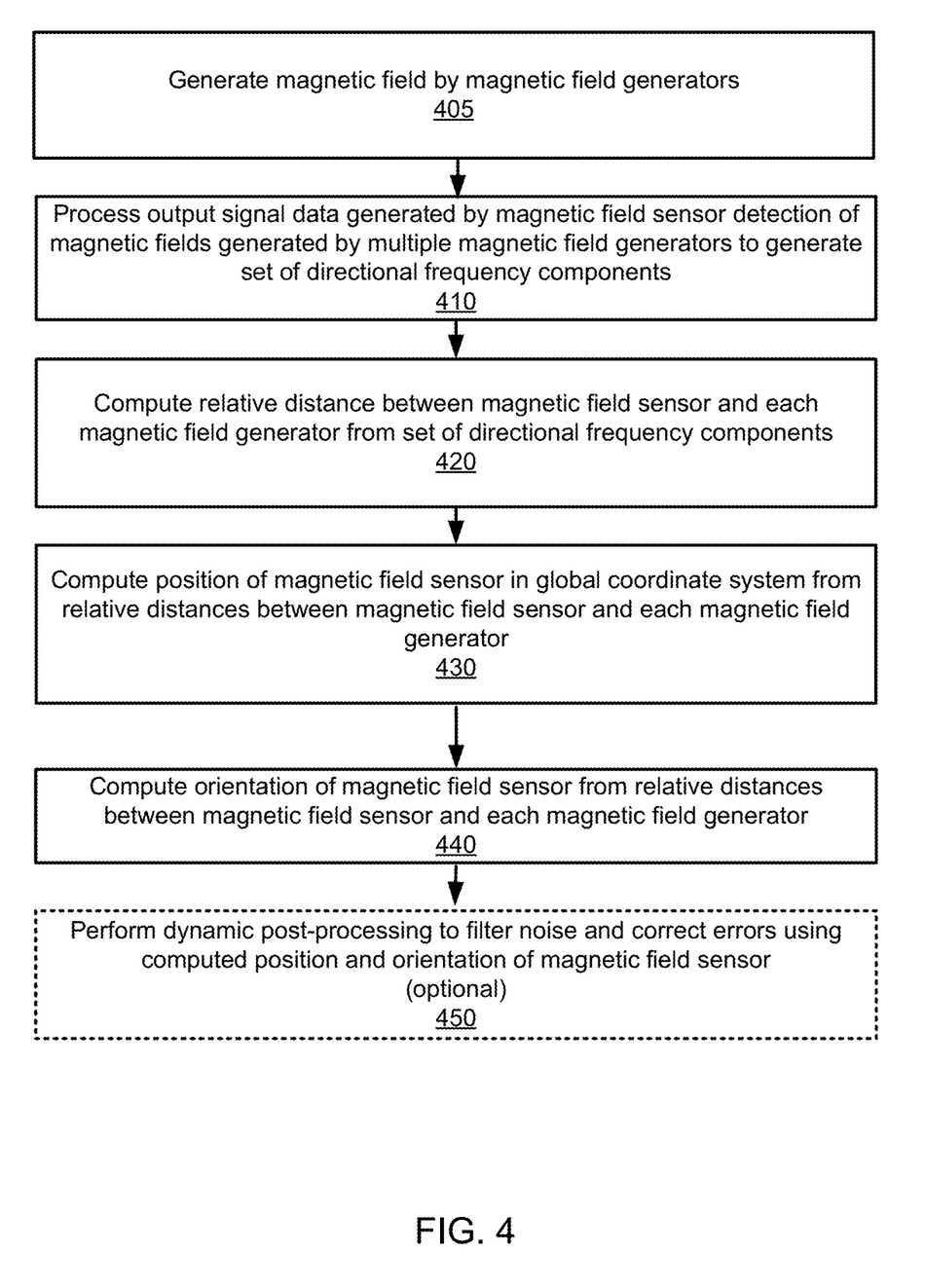
FIG. 4 illustrates a flowchart of a method for tracking position and orientation over time of magnetic field sensors on a wearable device, in accordance with one or more embodiments.

FIG. 4 is a flowchart of one embodiment of a method for determining positions of magnetic field sensors coupled to portions of a device relative to one or more magnetic field generators. In various embodiments, the method may include different or additional steps than those described below in conjunction with FIG. 4. Additionally, in some embodiments, steps of the method may be performed in different orders than the order described in conjunction with FIG. 4.

One or more magnetic field generators, such as those described above in conjunction with FIGS. 2A-3 generate 405 one or more magnetic fields. The magnetic field generators have predefined or predetermined positions relative to a wearable device. For example, one or more magnetic field generators have predefined positions on portions of the wearable device. As another example, one or more magnetic field generators are separate from the wearable device and located in predefined positions relative to the wearable device. In some embodiments, a single magnetic field generator generates 405 the one or more magnetic fields. When a single magnetic field generator is used, the single magnetic field generator comprises at least three coils at a single location that generate magnetic fields in at least three orientations. Using a single magnetic field generator allows a device generating the magnetic fields to have a smaller form factor than other implementations using three or more magnetic field generators positioned at separate locations. Alternatively, using multiple magnetic field generators at separate predefined locations increases accuracy. In various embodiments, three or more magnetic field generators having predefined locations relative to a wearable device generate 405 magnetic fields.

Each magnetic field generator generates 405 magnetic fields at multiple known frequencies in various embodiments. In some embodiments, each magnetic field generator may generate 405 magnetic fields using two or more distinct frequencies. Thus, an embodiment with four magnetic field generators that each generate 405 magnetic fields using two frequencies results in the generation of magnetic fields with eight distinct frequencies. In an embodiment where three magnetic field generators each generate 405 magnetic fields using three distinct frequencies, magnetic fields having 12 distinct frequencies are generated 405.

Frequencies at which magnetic fields are generated 405 by magnetic field generators may be determined using a variety of factors. In some embodiments, the frequencies at which magnetic field generators generate 405 magnetic fields are selected to reduce second order harmonics and reduce interference between different magnetic fields. If each magnetic field generator generates 405 magnetic fields using two distinct frequencies, a frequency and an additional frequency that is higher than the frequency is used by a magnetic field generator to generate 405 two magnetic fields. In various embodiments, the additional frequency is higher than the frequency by at least a threshold amount to reduce interference between the generated 405 magnetic fields.

One or more magnetic field sensors, such as those further described above in conjunction with FIGS. 2A-3 are positioned at locations within the wearable device or are positioned to contact one or more portions of a user's body. For example, a magnetic field sensor is positioned at a location contacting a portion of the user's finger and acts as a proxy for a location of the portion of the user's finger. A magnetic field sensor detects the generated magnetic fields and generates an output signal based on the detected magnetic fields. For example, if four magnetic field generators each generate 405 magnetic fields using two frequencies, the output signal from the magnetic field sensor is based on the eight magnetic fields detected by the magnetic field sensor.

An output signal generated by the magnetic field sensor is based on a strength and a direction of a magnetic field generated 405 by a magnetic field generator that is detected by the magnetic field sensor. As described previously, when multiple magnetic field generators are generating 405 magnetic fields at overlapping times, the output signal generated by the magnetic field sensor is a composite reading based on the directions and orientations of the magnetic fields generated by multiple magnetic field generators generating 405 magnetic fields that are detected by the magnetic field sensor. An output signal from a magnetic field sensor is processed 410 by the measurement circuit 330 to generate a set of directional frequency components corresponding to the frequencies used by different individual magnetic field generators to generate 405 magnetic fields. In various embodiments, the measurement circuit 330 applies a FFT filter to an output signal from a magnetic field sensor to generate the set of directional frequency components corresponding to the frequencies used by different individual magnetic field generators to generate 405 magnetic fields detected by the magnetic field sensor.

Based on the set of directional frequency components, spatial vectors representing positions of each magnetic field sensor relative to each magnetic field generator are computed 420, as further described above in conjunction with FIGS. 1C-3. In various embodiments, spatial vectors representing positions of a magnetic field sensor relative to each magnetic field generator are computed 420. The position analyzer 360 described above in conjunction with FIG. 3, receives an output signal from the measurement circuit 330 or, optionally, the Kalman filter 350. From the output signal, the position analyzer 360 computes 420 positions of the magnetic field sensor relative to each magnetic field generator. In various embodiments, the position analyzer 360 applies a trained machine learning regression model, as further described above in conjunction with FIG. 1D, to the output signal.

From the computed distances of the magnetic field sensor relative to each magnetic field generator and the predefined positions of the magnetic field generators, the position analyzer 360 computes 430 a spatial position of the magnetic field sensor in a global coordinate system. The position analyzer 360 communicates the computed relative distances between the magnetic field sensor and each of the magnetic field generators to the orientation analyzer 370. From the relative distances between the magnetic field sensor and each of the magnetic field generators, and output signals from the measurement circuit 330 (or from the Kalman filter 350), the orientation analyzer 370 computes 440 the absolute orientation of the field sensor, as further described above in conjunction with FIG. 3. Thus, the position analyzer 360 and the orientation analyzer 370, respectively, determine a position of the magnetic field sensor in a global coordinate system and an orientation of the magnetic field sensor in the global coordinate system. In various embodiments, the position analyzer 360 and the orientation analyzer 370 receives the output signal from the measurement circuit 330 directly or from the Kalman filter 350. In some embodiments, the Kalman filter 350 is integrated into the measurement circuit 330.

When a position and an orientation of the magnetic field sensor are computed at different times, the computed position and the computed orientation of the magnetic field sensor are communicated to the Kalman filter 350. As further described above in conjunction with FIGS. 1D and 3, the Kalman filter 350 employs a noise model along with prior estimates of positions and orientations of the magnetic field sensor in the global coordinate system to filter output signals from the magnetic field sensor 110. Application of the Kalman filter to output signals from the magnetic field sensor 110 improves accuracy of subsequent computation of position and orientation of the magnetic field sensor 110 in the global coordinate system by reducing statistical noise.

In various embodiments, the computed orientation and position of the magnetic field sensor in the global coordinate system are provided to a display device, which modifies presented content based on the computed orientation and position of the magnetic field sensor in the global coordinate system. For example, the display device modifies a graphical representation of a portion of the user's body proximate to the magnetic field sensor based on the computed orientation and position of the magnetic field sensor in the global coordinate system. Alternatively or additionally, the computed orientation and position of the magnetic field sensor in the global coordinate system are provided to a feedback mechanism that provides haptic feedback to the portion of the user's body proximate to the magnetic field sensor based on the computed orientation and position of the magnetic field sensor in the global coordinate system.

In one or more embodiments, the disclosed systems and methods for determining a position and an orientation of a magnetic field sensor are used in conjunction with a virtual reality (VR) system. For example, the disclosed methods for detecting positions of fingers or other body parts proximate to magnetic field sensors are used to provide information about or to render a state of a body part (e.g., a hand) of a user proximate to a magnetic field system in a virtual environment. For example, states of a hand (e.g., open, closed, pointing, gesturing, etc.) proximate to a wearable device including one or more magnetic field sensors are determined based on the detected positions or locations of portions of the hand (e.g., fingers or finger tips) proximate to different magnetic field sensors.

The figures depict various embodiments of the present invention for purposes of illustration only. One skilled in the art will readily recognize from the following discussion that alternative embodiments of the structures and methods illustrated herein may be employed without departing from the principles of the invention described herein.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A device comprising:
a plurality of magnetic field generators, each magnetic field generator located at a predetermined position relative to the device and each magnetic field generator configured to generate magnetic fields using at least two distinct frequencies;
one or more magnetic field sensors, each magnetic field sensor configured to detect magnetic fields generated by at least a set of the plurality of magnetic field generators and configured to generate an output signal based on strengths and directions of the detected magnetic fields generated by each of at least the set of the plurality of magnetic field generators;
a position analyzer coupled to the one or more magnetic field sensors, the position analyzer configured to compute a spatial location of a magnetic field sensor based on an output signal received from the magnetic field sensor and the predetermined positions of each of the magnetic field generators relative to the device; and
an orientation analyzer coupled to the position analyzer and to the one or more magnetic field sensors, the orientation analyzer configured to compute an orientation of the magnetic field sensor from relative distances between the magnetic field sensor and each of the plurality of magnetic field generators and the output signal received from the magnetic field sensor.

2. The device of claim 1, wherein the plurality of magnetic field generators comprises at least three electromagnets.

3. The device of claim 2, wherein each electromagnet is modulated to generate magnetic fields at each of the at least two distinct frequencies during overlapping times.

4. The device of claim 3, wherein the at least two distinct frequencies comprises a frequency and an additional frequency that is higher than the frequency.

5. The device of claim 3, further comprising:
a measurement circuit coupled to each of the one or more magnetic field sensors, to the position analyzer, and to the orientation analyzer, the measurement circuit configured to receive the output signal from the magnetic field sensor and to generate a set of directional frequency components corresponding to each of the at least two distinct frequencies used by each electromagnet to transmit magnetic fields.

6. The device of claim 5, wherein the measurement circuit generates the set of directional frequency components corresponding to each of the at least two distinct frequencies used by each electromagnet to transmit magnetic fields by applying a fast Fourier transform convolutional filter to the output signal received from the magnetic field sensor.

7. The device of claim 5, wherein the position analyzer is configured to:
determine a position of the magnetic field sensor relative to each of the plurality of magnetic field generators using the set of directional frequency components and magnetic field strength of magnetic fields generated by each magnetic field generator and detected by the magnetic field sensor and the predetermined positions of each of the magnetic field generators relative to the device.

8. The device of claim 7, wherein the position analyzer is configured to determine the position of the magnetic field sensor relative to each of the plurality of magnetic field generators by applying a trained machine learning regression model to the set of directional frequency components and to magnetic field strength of magnetic fields generated by each magnetic field generator and detected by the magnetic field sensor.

9. The device of claim 7, wherein the spatial location of the magnetic field sensor is determined from the positions of the magnetic field sensor relative to each of the plurality of magnetic field generators and the predetermined positions of each of the magnetic field generators relative to the device.

10. The device of claim 5, further comprising:
a Kalman filter coupled to the measurement circuit, coupled to the position analyzer, and coupled to the orientation analyzer, the Kalman filter configured to filter the output signal from the magnetic field sensor using a noise model along with one or more prior estimates of spatial positions and orientations of the magnetic field sensor and to transmit the filtered output signal to the position analyzer and to the orientation analyzer.

11. The device of claim 1, wherein the device comprises a glove, and each of the one or more magnetic field sensors are located on portions of the glove configured to contact portions of a hand of the user.

12. The device of claim 11, wherein the portions of the glove configured to contact portions of the hand of the user comprise portions of fingers of the glove.

13. A method comprising:
generating a plurality of magnetic fields from each of a plurality of magnetic field generators, each magnetic field generator located at a predetermined position relative to a device and each magnetic field generator configured to generate magnetic fields using at least two distinct frequencies;
detecting the plurality of magnetic fields at a magnetic field sensor;
generating, by the magnetic field sensor, an output signal based on strengths and directions of magnetic fields generated by each of the plurality of magnetic field generators and detected by the magnetic field sensor;
computing a spatial location of the magnetic field sensor based on the output signal generated by the magnetic field sensor and the predetermined positions of each of the magnetic field generators relative to the device; and
computing an orientation of the magnetic field sensor from relative distances between the magnetic field sensor and each of the plurality of magnetic field generators and the output signal generated by the magnetic field sensor.

14. The method of claim 13, wherein the plurality of magnetic field generators comprises at least three electromagnets.

15. The method of claim 14, wherein each electromagnet is modulated to transmit magnetic fields at each of the at least two distinct frequencies during overlapping times.

16. The method of claim 15, wherein the at least two distinct frequencies comprises a frequency and an additional frequency that is higher than the frequency.

17. The method of claim 15, wherein computing the spatial location of the magnetic field sensor based on the output signal generated by the magnetic field sensor and the predetermined positions of each of the magnetic field generators relative to the device comprises:
generating a set of directional frequency components corresponding to each of the at least two distinct frequencies used by each electromagnet to transmit magnetic fields; and
computing a position of the magnetic field sensor relative to each of the plurality of magnetic field generators using the set of directional frequency components and magnetic field strength of magnetic fields generated by each magnetic field generator and detected by the magnetic field sensor and the predetermined positions of each of the magnetic field generators relative to the device.

18. The system of claim 17, wherein generating the set of directional frequency components corresponding to each of the at least two distinct frequencies used by each electromagnet to transmit magnetic fields comprises:
applying a fast Fourier transform convolutional filter to the output signal generated by the magnetic field sensor to generate the set of directional frequency components corresponding to each of the at least two distinct frequencies used by each electromagnet to transmit magnetic fields.

19. The method of claim 15, wherein generating the set of directional frequency components corresponding to each of the at least two distinct frequencies used by each electromagnet to transmit magnetic fields comprises:
applying a trained machine learning regression model to the set of directional frequency components and to magnetic field strength of magnetic fields generated by each magnetic field generator and detected by the magnetic field sensor.

20. The method of claim 13, wherein generating, by the magnetic field sensor, the output signal based on strengths and directions of magnetic fields generated by each of the plurality of magnetic field generators and detected by the magnetic field sensor comprises:
generating a filtered output signal by applying a Kalman filter to the output signal, the Kalman filter configured to filter the output signal using a noise model along with one or more prior estimates of spatial positions and orientations of the magnetic field sensor.

* * * * *

UNITED STATES PATENT AND TRADEMARK OFFICE
CERTIFICATE OF CORRECTION

PATENT NO. : 10,802,586 B1
APPLICATION NO. : 16/174647
DATED : October 13, 2020
INVENTOR(S) : Zhao Page 1 of 1

It is certified that error appears in the above-identified patent and that said Letters Patent is hereby corrected as shown below:

In the Claims

In Column 20, Claim 18, Line 33, delete "The system of claim" and insert -- The method of claim --, therefor.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*